Feb. 7, 1939.  O. M. SMITH  2,146,599
MACHINE FOR LAYING OUT AND MARKING OPHTHALMIC LENSES
Filed Feb. 26, 1936  3 Sheets-Sheet 1
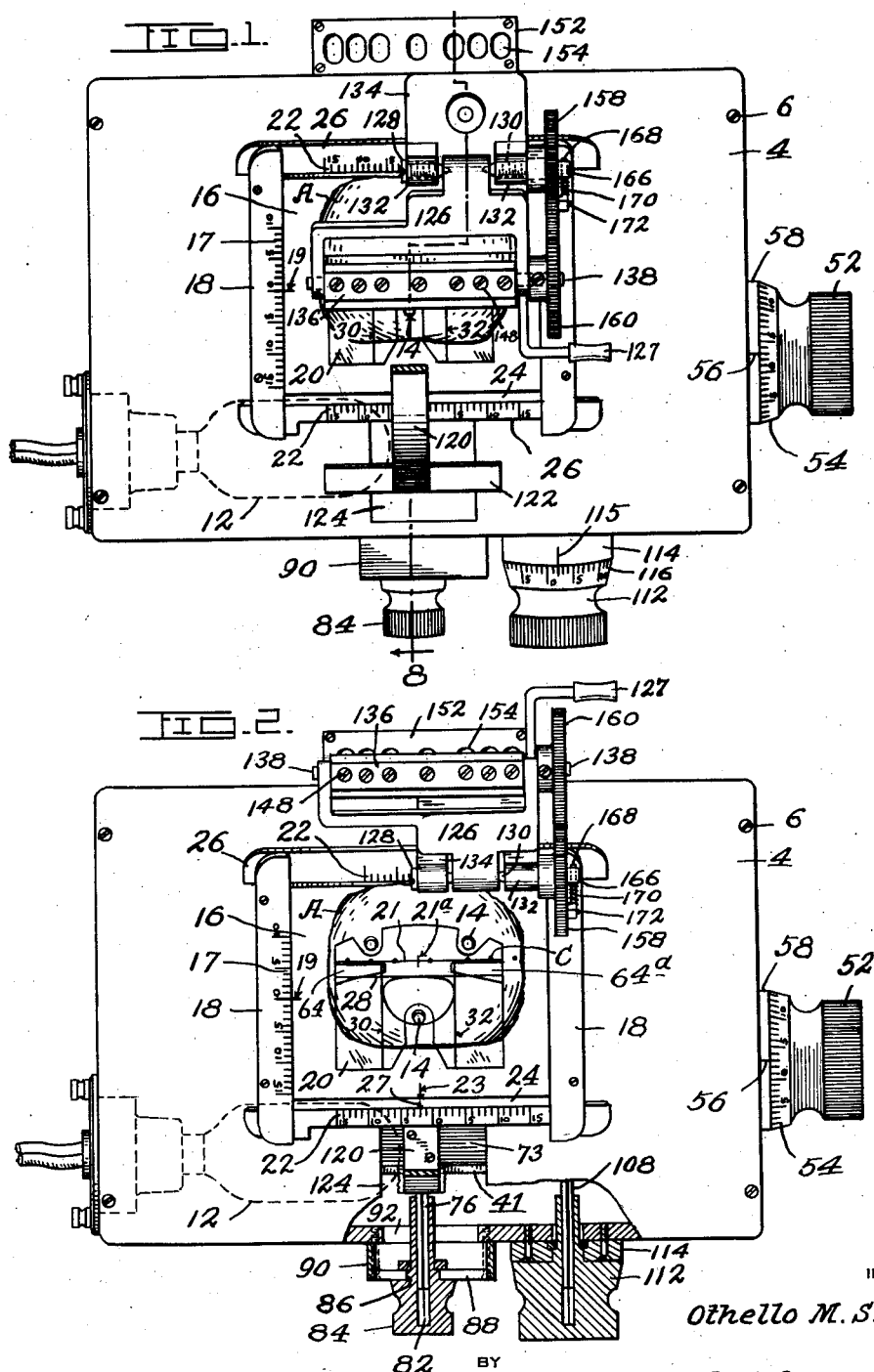
INVENTOR
Othello M. Smith,
BY
F. G. Fischer,
ATTORNEY.

Feb. 7, 1939.   O. M. SMITH   2,146,599
MACHINE FOR LAYING OUT AND MARKING OPHTHALMIC LENSES
Filed Feb. 26, 1936   3 Sheets-Sheet 2
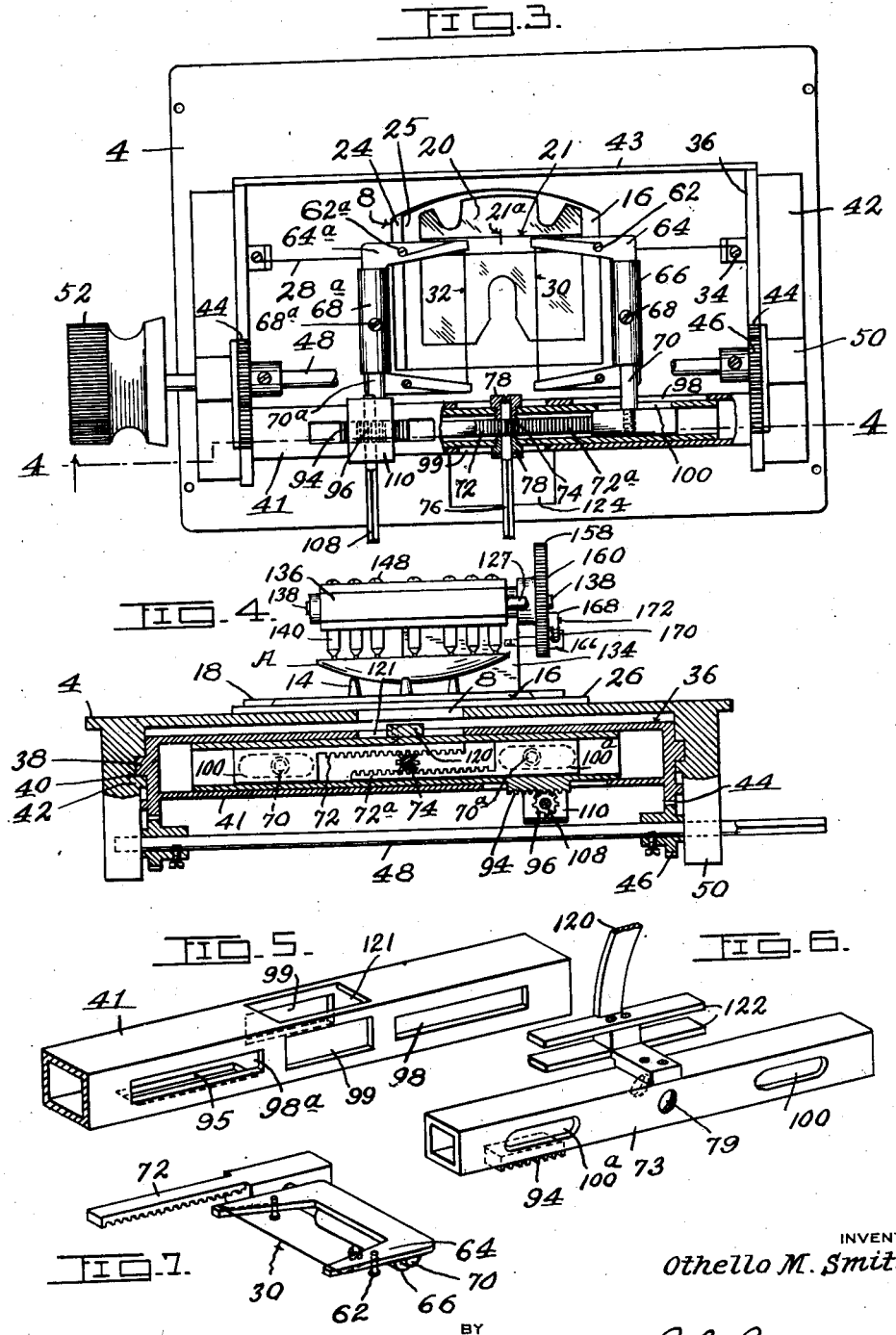
INVENTOR
Othello M. Smith,
BY
F. G. Fischer,
ATTORNEY

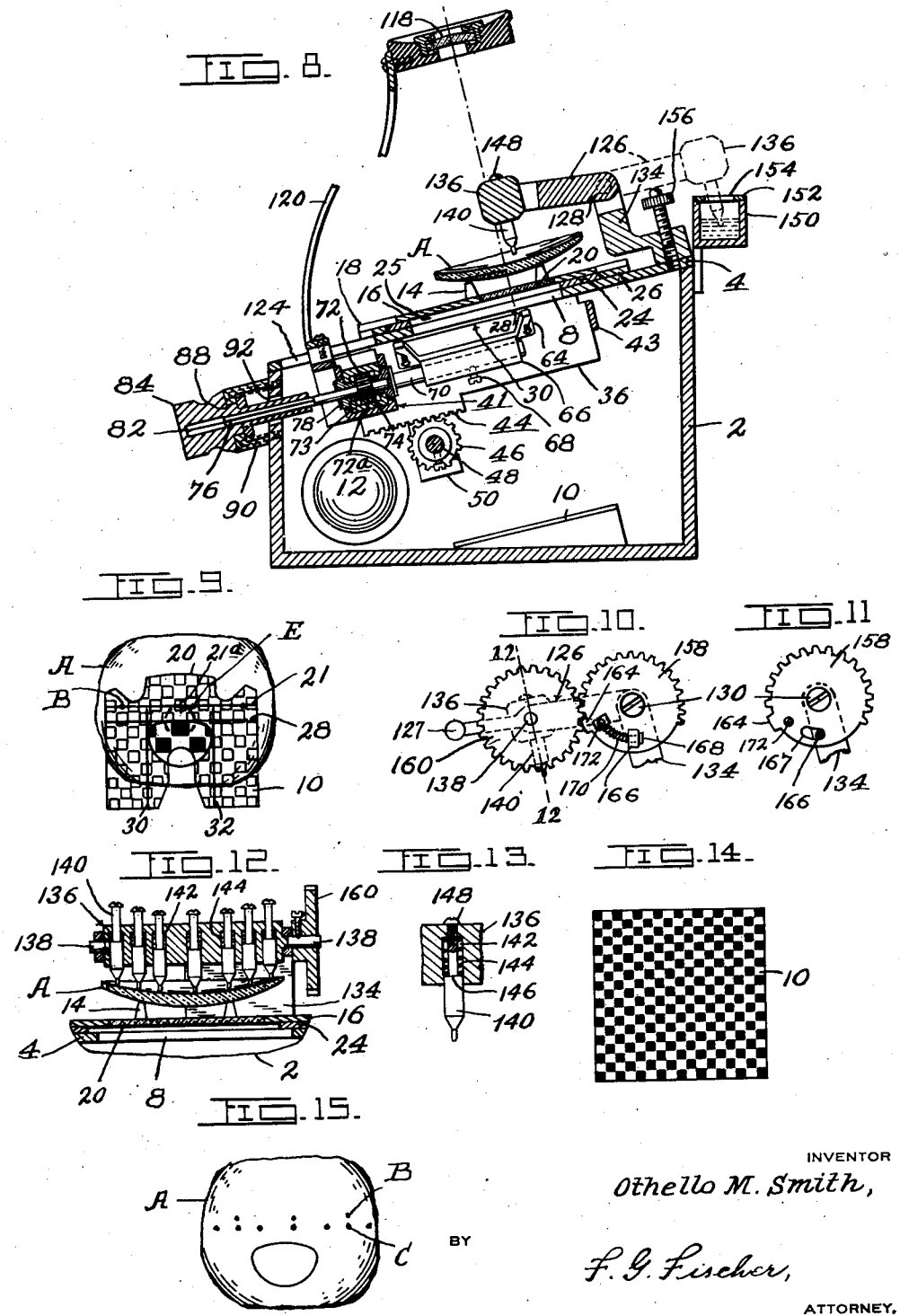

Patented Feb. 7, 1939

2,146,599

UNITED STATES PATENT OFFICE 2,146,599

MACHINE FOR LAYING OUT AND MARKING OPHTHALMIC LENSES

Othello M. Smith, Kansas City, Mo.

Application February 26, 1936, Serial No. 65,864

16 Claims. (Cl. 33—174)

My invention relates to a machine on which ophthalmic lenses (that is single focus, bifocal, or multifocal lenses that have had both surfaces ground and polished) may be expediously and accurately laid out and marked according to certain prescriptions preparatory to being cut, edged and mounted in a frame or nose piece.

With the method now in general use, the ground lenses are marked with three dots for optical center and axes, if the lenses have a cylindrical value, on apparatus now commonly used by opticians. They are next placed on a lens marking chart having a multiplicity of lines designed to assist the optician in laying out and marking by hand, bifocal lenses for the amount of "inset" and the amount of "drop" of the segment as they should appear in the finished lenses according to certain prescriptions. These lines also assist the optician in marking the horizontal axis and the geometrical center of the lenses so that the same may be properly positioned in an edge grinding machine and afterward located accurately in the frame or nose piece.

The lens marking charts above referred to have so many lines to adapt them for use under a great variety of conditions, that they are confusing and considerable care is required to avoid mistakes when performing the marking operation. This is especially true if the lens have a complicated grinding.

An important object of my invention is to provide a machine in which the marking operation cvan be performed with greater accuracy and facility and in which the liability of error will be substantially eliminated. A further object is to provide a machine of this character which can be quickly adjusted to any set of conditions that may arise in the marking of lenses preparatory to cutting, grinding their edges and mounting them in a frame or nose piece.

Another object is to provide means whereby the outline of the lens segment may be clearly defined from the remainder of the lens, so that no difficulty may be experienced in properly positioning the segment in the machine in proper relation to a marker mechanism having a row of styluses for marking the geometrical center and the mechanical axis of the finished lens.

A further object is to provide a machine of this character with segment locating means which may be adjusted in one direction to indicate the amount of "drop" of the segment relatively to the point of contact of a center stylus with the lens and also adjusted in another direction to indicate the degree of "inset" to one side or the other of said center stylus.

A further object is to provide a marker mechanism having a row of yieldingly mounted styluses adapted to be alternately moved into an ink-well and into contact with the lens for marking the geometrical center and the horizontal axis of the finished lens upon the uncut lens to serve as a guide for the cutting, edging and mounting operations.

Another object is to provide gearing whereby when the stylus carrier of the marker mechanism is swung towards the uncut lens the styluses will be pointed downward to dot the lens along the geometrical center and the horizontal axis of the finished lens, and when the carrier is swung towards the ink-well the styluses will also be pointed downward to enter said ink-well.

A further object is to provide a machine of this character which may be employed to advantage in duplicating bifocal and other multifocal lenses when the original prescription is not available, thus when one of the lenses of a pair of spectacles becomes broken or otherwise damaged a duplicate thereof may be readily had without the aid of the original prescription.

Other objects will hereinafter appear, and in order that the invention may be fully understood, reference will now be had to the accompanying drawings, in which:

Fig. 1 is a plan view of the machine with the lens marker mechanism thereof swung forward into active position.

Fig. 2 is a plan view, partly in section, of the machine with the marker mechanism swung backward into inactive position to submerge the stylus points in ink in the ink-well.

Fig. 3 is an inverted plan view of the removable top of the machine, on the under side of which the major portion of the mechanism is assembled as shown.

Fig. 4 is a cross section on line 4—4 of Fig. 3 showing the removable top of the machine in normal position and a dial removed from its shaft.

Fig. 5 is a detail perspective view of a tubular member forming part of the carriage frame.

Fig. 6 is a detail perspective view of a sighting lens bracket and a tubular member, which latter is adapted to slide within the tubular member shown in Fig. 5.

Fig. 7 is a detail perspective view of one of a plurality of gages used in locating the segments of bifocal and multifocal lenses.

Fig. 8 is a cross sectional view of the machine taken on line 8 of Fig. 1, with the addition of the sighting-lens.

Fig. 9 is a fragmentary plan view showing part of the means for clearly defining the outline of the lens segment.

Fig. 10 is a side elevation of the marker mechanism.

Fig. 11 is a detail of one of the gears for causing the styluses to alternately point downwardly preparatory to marking the lens and entering the ink-well.

Fig. 12 is a vertical section on line 12—12 of Fig. 10, with the addition of an uncut lens and supporting means therefor.

Fig. 13 is a fragmentary sectional view showing an enlargement of one of the styluses of the marker mechanism.

Fig. 14 is a plan view of a target employed in clearly defining the segment from the remainder of the lens.

Fig. 15 is a detail of an uncut bifocal lens dotted and ready to be finished to shape and size.

As illustrated, my machine comprises a box-like housing equipped with supporting means for the uncut lens, a gage to which said lens may be set preparatory to positioning its segment relatively to the prescribed optical center and axis as determined by the three dots placed on the lens by the conventional apparatus previously mentioned, means for visually locating the segment in the lens, gages to which the segment of the lens may be set to determine the amount of "drop" and the amount of "inset" of the segment relative to the optical center in accordance with certain prescribed formula, and marker mechanism by which the prescribed geometrical center and horizontal axis may be dotted upon the lens.

The housing, indicated by the reference numeral 2, is provided with an inclined top 4 which forms a convenient work-table for the operator. The top 4 is removably held in place upon the housing 2 with suitable means such as screws 6 so that access may be readily had to the interior mechanism, a large part of which is assembled on the underside of said top 4, as shown by Figs. 3, 4 and 8.

A sight-opening 8 is formed in the top 4 through which a target 10, illuminated by rays of light from a lamp 12, may be viewed. The target 10 and the lamp 12 are located in the lower portion of the housing 2, and said target 10 is preferably arranged parallel to the inclined top 4 as shown by Fig. 8. The upper face of the target 10 is divided into a multiplicity of relatively small squares, adjacent ones of which are contrasted in color as shown on the drawings. With the foregoing arrangement it is apparent that when an uncut bifocal lens, indicated by the reference character A, is placed in position over the sight-opening 8, that portion of the target included in the area of the segment of the lens will be magnified over that portion seen through the remainder of the lens, and thereby form a contrast that will clearly define the outline of the segment. This contrast is increased by the different colors of the squares of the target 10, but it is apparent that other forms of targets may be used without departing from the spirit and scope of my invention.

Means for supporting the lens A over the sight-opening 8 comprises a lens carrier 16 provided with suitable means in the form of three studs 14 which may be of rubber, or metal pins covered with rubber, to prevent scratching of the lens or accidental slippage thereof upon said studs 14. In the present instance the studs 14 are spaced apart somewhat like the corners of a triangle upon the lens carrier 16 which comprises a rectangular plate having two beveled edges underlapping adjacent beveled edges of a pair of guide rails 18, between which the lens carrier 16 is adapted to be slid forwardly and backwardly by hand. One of the rails 18 has a scale 17 inscribed thereupon to cooperate with an index mark 19 on the lens carrier 16. The scale 17 is reversely numbered from a central zero mark, so that it may be readily determined how far forward or backward the lens carrier 16 has been moved with respect to the index mark 19. The lens carrier 16 has a sight-opening spaced above the sight-opening 8 and closed by a transparent medium 20 such as clear glass to avoid obscuring the underlying mechanism and for preventing the lens A and other articles from falling into the housing 2.

The transparent medium 20 has a transverse line 21 inscribed thereon to represent the 180th meridian which is intersected midway between its ends by a short cross line 21a. In order that the lens carrier 16 may be moved laterally as well as forwardly and backwardly I fix the guide rails 18 upon a slide 24 comprising a rectangular plate having a sight-opening 25 spaced between the sight-opening 8 and the transparent medium 20. The slide 24 may be slid by hand to the right or left upon the housing top 4 where it is directed in its movements by a pair of guide rails 26 arranged at right angles to the guide rails 18 and fixed to the housing top 4. The guide rails 26 have similar scales 22 inscribed thereon and reading in reverse directions from a central zero graduation to coact with the index marks 23 on the lens carrier 16, so that the latter may be stopped at any predetermined point in its lateral movement. For a like reason the slide 24 has index marks 27. By providing both rails 26 with scales 22 one or the other will be visible when the lens carrier 16 is moved forward or backward far enough to cover either scale. The adjacent edges of the slide 24 and the guide rails 26 are beveled as shown by Fig. 8, to slidably hold said slide 24 upon the housing top 4. From the foregoing it will be readily understood that the lens carrier 16 has a compound movement in directions at right angles to each other which may be utilized in locating the amount of "drop" and the amount of "inset" of the lens segment relatively to the geometrical and optical centers and axes of the finished lens in accordance with a predetermined prescription.

The lens carrier 16 is assisted in locating the lens segment as above stated by three line gages 28, 30 and 32. The gage 28 is mounted for forward and backward movements, while the gages 30, 32 are mounted for forward and backward movements with the gage 28, also for simultaneous lateral movements in reverse directions to each other, and for simultaneous lateral movement in the same direction as will hereinafter appear. The gage 28 consists preferably of a wire strand or its equivalent arranged parallel with the 180th meridian line 21 and is drawn taut beneath the sight-opening 8 by screws 34 mounted in opposite sides of a carriage 36 arranged to travel forward and backward beneath the top 4 of the housing 2 and carry the gages 28, 30 and 32 therewith.

The sides of the carriage 36 are provided with ribs 38 slidably mounted in lengthwise grooves 40 in the adjacent sides of guide rails 42 fixed to the under side of the top 4. The sides of the carriage 36 are united near their rear ends with a tubular member 41 and at their forward ends with a transverse bar 43. The lower edges of the sides of the carriage 36 have racks 44 which intermesh with a pair of pinions 46 fixed upon a shaft 48 journaled in bearings 50 depending from the guide rails 42. One end of the shaft 48 extends through an opening in the right side of the housing 2 and is provided with a dial 52 whereby it may be rotated to advance or retract the carriage 36. The dial 52 has a scale 54 inscribed thereon which reads in opposite directions from a central zero graduation to cooperate with an index mark 56 in determining how far the carriage 36 with the gage 28 has been moved forward or backward with respect to said index mark 56, which latter is inscribed on a stationary disk 58 fixed to the adjacent side of the housing 2.

The gages 30 and 32, like the gage 28, consist preferably of strands of wire arranged at right angles to the gage 28. The gage 30 is drawn taut by suitable means such as screws 62 threaded in a pair of arms 64 spaced apart and fixed to opposite ends of a sleeve 66 secured by suitable means such as a set screw 68 to a rod 70 fixed at one end to a rack 72 slidably mounted in a tubular member 73 which is slidably mounted in the tubular member 41. The gage 32 and its mountings are duplicates of the gage 30 and its mountings as is evidenced by corresponding reference numerals with exponents a, the only difference being that the arms 64a are reversely disposed to the arms 64 and the rack 72a is reversely disposed to the rack 72.

As shown by Fig. 4, the rack 72 is spaced above the rack 72a to admit an intervening pinion 74 whereby said racks and the respective gages 30, 32 may be simultaneously moved in reverse directions. The pinion 74 is fixed to a shaft 76 journaled in bearings 78 threaded in apertures 79 in opposite sides of the tubular member 73. The shaft 76 is rectangular in cross section and slidably engages the correspondingly shaped axial bore 82 of a knob 84 having an annular grooved portion 86 journaled in the slotted portion 88 of an elongated bearing 90 secured to the front wall of the housing 2. The foregoing arrangement permits the shaft 76 to slide longitudinally in the knob 84 and thus move forward and backward with the carriage 36. It also permits the shaft 76 and the knob 84 to be rotated axially and move laterally in the slot 88 and a slot 92, which latter coincides with the former and is formed in the front wall of the housing 2, Fig. 2. Lateral movement of the shaft 76 and the knob 88 is accomplished by longitudinal movement of the tubular member 73 within the tubular member 41.

The primary object in moving the tubular member 73 longitudinally is to effect simultaneous movement of the gages 30, 32, to the right or left. It is understood, of course, that as the tubular member 73 is moved longitudinally it carries the racks 72, 72a and the pinion 74 therewith, and said racks 72, 72a in turn carry the respective gages 30, 32, therewith. Longitudinal movement of the tubular member 73 is accomplished by a rack 94 fixed to said tubular member 73, and a pinion 96 intermeshing with said rack 94. Rack 94 operates in a slot 95 in the tubular member 41. In order to permit gages 30, 32 and the bearings 78 to move to the right or left, the tubular member 41 is provided with longitudinal slots 98, 98a and 99, through which rods 70, 70a, and bearings 78, respectively, project. The rods 70, 70a, also project through longitudinal slots 100, 100a, respectively, in the tubular member 73, so that the latter may remain stationary while the gages 30, 32, are being moved in reverse directions to each other by the pinion 74 and the racks 72, 72a, as above stated.

The pinion 96 is fixed to a shaft 108, journaled in a bearing 110 on the tubular member 41. Shaft 108 is rectangular in cross section and slidably fits in the corresponding counterbore of a dial 112 so that the shaft 108 may move forward and backward with the carriage 36 and at the same time be rotated by the dial 112 which is journaled in a disk 114 fixed to the front wall of the housing 2 and provided with an index mark 115 for cooperation with a scale 116 inscribed on the dial 112 and numbered in reverse directions from a central zero graduation, so that it may be readily determined how far the tubular member 73 with the gages 30, 32, and other parts carried thereby have been moved to the right or left with respect to the index mark 115.

All scales of the machine are preferably graduated in millimeters.

118 designates a sighting-lens for cooperating with the respective gages 28, 30 and 32, in determining the proper position of the lens A preparatory to being marked for cutting and edging. Said sighting-lens is supported a suitable distance above the top 4 of the housing 2 by a bracket 120 fixed at its lower end upon the tubular member 73 in order to move forwardly, backwardly and also laterally to the right or left with said tubular member 73. The bracket 120 extends through a longitudinal slot 121 in the tubular member 41, and in order to lend stability thereto its lower portion is equipped with a pair of parallel members 122 one of which slides upon the upper surface and the other against the under surface of the top 4, which latter has a relatively large opening 124 to allow the bracket 120 to move with the tubular member 73 as above stated and also to permit ventilation of the housing 2, so that the same will not become unduly heated by the lamp 12 when energized. By mounting the sighting-lens 118 as stated it is always maintained in coaxial relation to a point midway between the gages 30, 32 regardless of the various positions to which the latter may be shifted, and its field of vision, indicated by the dotted circle E on Fig. 9, is constantly bisected by the gage 28. The foregoing arrangement insures accurate placement of the lens segment with respect to the gages 28, 30 and 32, as all errors heretofore due to viewing the lens segment and the gages at an improper angle are eliminated.

Referring more particularly to the lens marker mechanism, 126 designates a swingable member provided with a handle 127 and mounted at one end on aligned pivots 128 and 130 threaded in bearings 132 on the upper end of a bracket 134 fixed to the top 4 of the housing. The swingable member 126 is bifurcated at its other end to receive a stylus carrying member 136 equipped with trunnions 138 journaled in the bifurcated end of the swingable member 126. The stylus carrying member 136, in the present instance, is equipped with a row of seven transversely mounted styluses 140, one being located midway between the ends of the member 136 and the others being arranged in groups of three at opposite sides of the center stylus.

Each stylus 140 is mounted in its respective counterbore 142 in the member 136 and normally pressed outwardly by a spring 144 interposed between the upper end of the counterbore 142 and a shoulder 146 on the stylus. Each stylus 140 has a reduced upper portion extending freely through an opening communicating with the upper end of the counterbore 142, and is provided with a screw 148 to limit the downward movement of the stylus under the action of the respective springs 144 and also for setting the stylus so that the lower marking points of all the styluses will be normally held in the same horizontal plane. By thus yieldably mounting the styluses 140 in the carrying member 136 they may accommodate themselves to the curvature of the lens A, Fig. 11, during the marking operation.

The styluses 140 are supplied with ink by an ink-well 150 secured to the rear wall of the housing 2 and equipped with a removable lid 152 having slots 154 through which the styluses may enter and leave the ink-well 150. As it is desirable to only submerge the marking points of the styluses 140 in the ink I provide an adjustable stop 156 threaded in the rear portion of the bracket 134 and extending upwardly into the path of the swingable member 126 to limit the downward movement thereof when swung to the dotted line position, Fig. 8. When the ink-well 150 is nearly full of ink stop 156 is adjusted upwardly and as the level of the ink recedes with use and evaporation the stop 156 is adjusted downwardly from time to time as required to keep the points of the styluses uniformly submerged.

In order that the styluses 140 may point downwardly when in the marking position shown by full lines and, also, when in the inking position shown by dotted lines, Fig. 8, I control the movement of the stylus carrying member 136 with gears 158 and 160. The gear 158 is journaled upon the threaded element 130 while the gear 160 is fixed upon one of the trunnions 138 by suitable means such as a set screw 162. Thus when the stylus carrying member 136 is swung to either position shown by full and dotted lines, Fig. 8, it will cause the gear 160 to travel over the gear 158, which operation rotates the gear 160 approximately a half revolution and thereby causes it to turn the points of the styluses downwardly as stated.

In order to better control the marking operation and avoid accidental contact of the lens A by the points of the styluses the gear 158 is provided with a shoulder 164 which checks rotation of the gear 160 just before the points of the styluses contact the lens A, Fig. 8, but in order that the styluses 140 may be depressed into contact with the surface of the lens to dot the same the gear 158 is yieldably connected to the bracket 134 by means of a screw 166 extending through a slot 167 in the gear 158 and threaded at its inner end in the bracket 134. The outer end of the screw 166 has an eye in which an arcuate member 168 is free to move longitudinally against the action of a coil spring 170 which normally holds the gear 158 stationary with one end of the slot 167 against the screw 166, as shown in Fig. 11. The arcuate member 168 is secured to the gear 158 by a pivot or other suitable element 172. With the foregoing arrangement it is apparent that the styluses 140 may be forced into engagement with the lens A from the position shown by Fig. 8, by pressing downwardly upon the handle 127, which operation causes the gear 160 to press downwardly on the shoulder 164 and turn the gear 158 the necessary distance against the resistance of the spring 170. When the points of the styluses 140 are pressed against the surface of the lens A they impose thereon a row of dots C which indicate the geometrical center and horizontal axis of the finished lens and constitute a guide for the cutting end edging of the unfinished lens.

The procedure for laying out and marking an uncut bifocal lens is as follows: The prescribed optical center and axis (if the lens has a cylindrical value) is marked with the conventional centering apparatus now in general use, which imposes a row of three dots B on the lens A, representing the 180th meridian with the center dot in the exact optical center of the lens.

The amount of "drop" and also the amount of "inset" relatively to the geometrical center of the finished lens being predetermined by the prescription, the dial 52 is rotated until the graduation on the scale 54, indicating the prescribed amount of "drop" of the lens segment below the geometrical center coincides with the index mark 56, after which the dial 112 is rotated to the right or left until the graduation on the scale 116, indicating the prescribed amount of "inset", coincides with the index mark 115, it being understood that the graduations at one side of the zero scale 116 will be used for right eye lenses and those at the other side for left eye lenses. The movement of the dial 52 causes a corresponding forward or backward movement of the gages 28, 30 and 32, and the movement of the dial 112 causes a corresponding movement to the right or left of the gages 30 and 32.

In the present instance I have shown the dial 52 rotated backwardly three points to indicate the amount of "drop" of the lens segment below the geometrical center and the dial 112 rotated two points to the left to indicate the amount of "inset", but it is to be understood that other adjustments may be made in accordance with different prescriptions.

Assuming that the lamp 12 has been energized to illuminate the target 10, that portion of the latter underlying the lens segment will be magnified and distinctly discloses the outline of said segment, Fig. 9, which otherwise would be almost invisible. The lens A is then placed by hand upon the lens carrier 16 in such position that the three dots B previously placed thereon will coincide with the line 21 and the center dot will coincide with the point of intersection of the cross lines 21, 21a. The sighting lens 118 is now sighted through and the carrier 16 and slide 24 are moved with the left hand until the opposed sides of the widest part of the segment coincides with the gages 30, 32, which may now, if necessary, be adjusted toward or away from each other by rotating the knob 84 with the right hand until they are spaced to coincide with the opposed sides of the segment as stated. The carrier 16 is next moved forward or backward until the highest marginal point of the segment coincides with the gage 28 and the center of the dotted circle E, as shown by Fig. 9. The foregoing operations insure correct positioning of the lens in accordance with the prescription.

The uncut lens A is now ready to be marked with my marker mechanism and the marking is accomplished by swinging the member 126 from the dotted line to the full line position disclosed by Fig. 8 and pressing down upon the handle 127 until the ink on the points of the styluses 140 is impressed upon the upper surface of the lens in the form of the row of dots C. These dots represent the 180th meridian of the finished lens with the center dot located exactly in the geometrical center of said finished lens. The unfinished lens may now be removed from the lens carrier 16 for cutting, edging and framing. Some prescriptions may require that the row of dots C be placed directly over the row of dots B and in order to avoid confusion in such instances the dots B are erased before imposing the dots C upon the lens.

The foregoing procedure is substantially followed in laying out and marking uncut multifocal lenses, it being understood that variations in adjustments may be made to meet the prescribed formulas for the different segments embodied in a multifocal lens.

When laying out bifocal or multifocal lenses it is not necessary to refer to the scales 17, 22 as they are utilized only when laying out a single focus lens as will now appear.

To lay out and mark an uncut single focus lens in which it is necessary to decenter the optical center from the geometrical center of the lens when edged to shape and size, the procedure is as follows: From a given prescription the lens is first marked on the optical center with the three dots B and the major axis (if the lens has a cylindrical value) is located in the same manner as described above for bifocal lenses. The three dots B indicate the 180th meridian, with the center dot representing the exact optical center. Assuming that the amount of decentration required by the prescription is 3 millimeters and that the lens is for the right eye, the lens carrier 16 and the slide 24 are moved to the left until the index marks 23 coincide with the third graduation at the left of the zeros on the respective scales 22. This operation locates the point of intersection of the cross lines 21, 21a 3 millimeters to the left of the zeros on scales 22. The uncut lens is now placed upon the studs 14 of the lens carrier 16 in such position that the three dots B coincide with line 21 and the center dot coincides with the point of intersection of the cross lines 21, 21a. The lens is now in correct position to be dotted with my marker mechanism to indicate the 180th meridian with the center dot in the geometrical center of the lens when edged to size and shape. If the lens is for the left eye the lens carrier 16 and the carrier 24 are moved to the right accordingly.

If the decentration indicated in the prescription is up or down, the lens carrier 16 is moved forward or backward until the index mark 19 reaches the correct graduation on the scale 17. From the foregoing it can readily be seen that the combined movements of the carrier 16 and the slide 24 enable decentrations to be made upward and inward, or upward and outward, or downward and inward, or downward and outward. It will also be understood that the gages 28, 30 and 32 are not required in the laying out and marking of single focus lenses.

My machine may also be used for duplicating the "inset" and the "drop" of finished bifocal lenses without referring to the prescription from which the original was prepared, by first placing the lens to be duplicated in the chuck of the conventional centering machine and imposing thereon three dots, representing the 180th meridian, with the center dot in the exact geometrical center of the lens. Assuming that all scales on my machine are adjusted to zero, the lens is placed upon the studs 14 with the three dots coinciding with line 21 and the center dot registering with the point of intersection of the lines 21, 21a. Then while sighting through the lens 118 the dial 52 is rotated to move the carriage 36 forward or backward until the gage 28 registers with the highest point of the periphery of the segment. The dial 112 is then rotated to shift the gages 30, 32 to the right or left and the knob 84 is rotated until said gages 30, 32 coincide with the respective sides of the segment. On completing the above adjustments the scale 54 on the dial 52 indicates how far the top of the segment is above or below the geometrical center and the scale 116 on the dial 112 indicates the correct amount of "inset" of the segment from the geometrical center of the lens, so that the duplicate lens may be correctly laid out and marked preparatory to being cut and edged to shape and size.

From the foregoing description taken in connection with the drawings it is apparent that I have provided a machine which is well adapted for the purpose intended, and while I have shown a preferred form of the invention I reserve all rights to such changes and modifications as properly fall within the spirit and scope of the invention as claimed.

Having thus described my invention, what I claim and desire to secure by Letters Patent, is:

1. In a machine of the class described, means for locating the horizontal axis and the geometrical center in prescribed relation to the marked optical center and the optical axis of an ophthalmic lens comprising main supporting means, a slide movable in a straight line to the right and left upon said supporting means, guide means for said slide fixed upon said supporting means, coacting scale means on said guide means and the slide to indicate the prescribed movement of the latter, a lens carrier movable by hand with the slide and also movable forward and backward in a straight line upon said slide, guide means for said lens carrier fixed upon the slide, means fixed on the lens carrier to cooperate with the marking on the lens in enabling accurate placement of the latter upon the lens carrier, and coacting means on the lens carrier and its guide means to indicate the prescribed movement of the lens carrier.

2. In a machine of the class described, means for locating the horizontal axis and the geometrical center in prescribed relation to the marked optical center and the optical axis of an ophthalmic lens comprising main supporting means, a slide movable in a straight line to the right and left upon said supporting means, guide means for said slide fixed upon said supporting means, coacting means on said guide means and the slide to indicate the movement of the latter, a lens carrier movable by hand with the slide and also movable forward and backward in a straight line upon said slide, guide means for said lens carrier fixed upon the slide, cross lines fixed on the lens carrier to cooperate with the marking on the lens in enabling accurate placement of the latter upon the lens carrier, coacting means on the lens carrier and its guide means to indicate the prescribed movement of the lens carrier, and means on the supporting means for impressing the horizontal axis and the geometrical center upon the lens when in prescribed position.

3. In a machine of the class described, means for locating the horizontal axis and the geometrical center in prescribed relation to the marked optical center and the optical axis of an ophthalmic lens comprising main supporting means having a top with a sight-opening therein, a slide movable in a straight line to the right and left upon said supporting means and provided with a sight-opening spaced above the first-mentioned one, guide means for said slide fixed upon said supporting means, coacting scale means on said guide means and the slide to indicate the prescribed movement of the latter, a lens carrier movable by hand with the slide and also movable forward and backward in a straight line upon said slide and provided with an opening having a transparent medium spaced above the sight-openings and having means to cooperate with the marking on the lens in enabling accurate placement of the lens upon the lens carrier, guide means for said lens carrier fixed upon the slide, and coacting means on the lens carrier and its guide means to indicate the prescribed movement of the lens carrier.

4. In a machine of the class described, means for locating the horizontal axis and the geometrical center in prescribed relation to the marked optical center and the optical axis of an ophthalmic lens comprising main supporting means having a top with a sight-opening therein, a slide movable in a straight line to the right and left upon said supporting means and provided with a sight-opening spaced above the first-mentioned one, guide means for said slide fixed upon said supporting means, coacting means on said guide means and the slide to indicate the prescribed movement of the latter, a lens carrier movable by hand with the slide and also movable forward and backward in a straight line upon said slide and provided with an opening having a transparent medium spaced above the sight-opening and also means to cooperate with the marking on the lens in enabling accurate placement of the lens upon the lens carrier, guide means for said lens carrier fixed upon the slide, coacting means on the lens carrier and its guide means to indicate the prescribed movement of the lens carrier, and means in the supporting means and below the sight-openings to illuminate the transparent medium.

5. In a machine of the class described, means for locating the horizontal axis and the geometrical center in prescribed relation to the marked optical center and the optical axis of an ophthalmic lens comprising main supporting means, a slide movable in a straight line to the right and left upon said supporting means, guide means for said slide fixed upon said supporting means, coacting means on said guide means and the slide to indicate the movement of the latter, a lens carrier movable forward and backward in a straight line upon said slide, guide means for said lens carrier fixed upon the slide, means fixed on the lens carrier to cooperate with the marking on the lens in enabling accurate placement of the latter upon the lens carrier, studs fixed to the lens carrier to support the lens, and coacting means on the lens carrier and its guide means to indicate the prescribed movement of the lens carrier.

6. In a machine of the class described, means for locating the segment in prescribed relation to the horizontal axis of a lens having its optical axis impressed thereon, comprising a housing with a sight-opening in its upper portion, a carriage mounted for forward and backward movement in a straight line in said housing, a gage fixed to the carriage extending transversely beneath the sight-opening and to which the upper margin of the segment may be set, means for moving the carriage including calibrated means to set the gage at the prescribed position, a lens carrier mounted at the upper portion of the housing for movement by hand to locate the upper margin of the segment in coincidence with the gage, and a transparent medium set in the lens carrier and through which the gage may be viewed, said medium having a line paralleling the gage and to which the optical axis may be set to insure proper placement of the lens upon the lens carrier.

7. In a machine of the class described, means for locating the segment in prescribed relation to the horizontal axis of a lens having its optical axis impressed thereon, comprising a housing with a sight-opening in the upper portion thereof, a carriage mounted for forward and backward movement in a straight line in said housing, a gage fixed to the carriage and extending transversely beneath the sight-opening and to which the upper margin of the segment may be set, rack means fixed to the carriage, pinion means meshing with said rack means, a shaft journaled in the housing and upon which said pinion means is fixed, calibrated means fixed to the shaft to rotate the same and coacting with a fixed index to enable the gage to be set at any prescribed position, a lens carrier mounted at the upper portion of the housing for movement by hand to locate the upper margin of the segment in coincidence with the gage, and a transparent medium set in the lens carrier and through which the gage may be viewed, said medium having a line paralleling the gage and to which the optical axis may be set to insure proper placement of the lens upon the lens carrier.

8. In a machine of the class described, means for locating the segment in prescribed relation to the horizontal axis of a lens having its optical cal axis impressed thereon comprising a housing with a sight-opening in the upper portion thereof, a carriage mounted for forward and backward movement in a straight line in said housing, a gage fixed to the carriage and extending transversely beneath the sight-opening and to which the upper margin of the segment may be set, means for moving the carriage including calibrated means to set the gage at the prescribed position, a lens carrier mounted at the upper portion of the housing for movement by hand to locate the upper margin of the segment in coincidence with the gage, a transparent medium set in the lens carrier and through which the gage may be viewed, said medium having a line paralleling the gage and to which the optical axis may be set to insure proper placement of the lens upon the lens carrier, and means mounted upon the housing for impressing the horizontal axis upon the lens.

9. In a machine of the class described, means for locating the segment in prescribed relation to the horizontal axis of a lens having its optical axis impressed thereon comprising a housing with a sight-opening in the upper portion thereof, a carriage mounted for forward and backward movement in a straight line in said housing, a gage fixed to the carriage and extending transversely beneath the sight-opening and to which the upper margin of the segment may be set, means for moving the carriage including calibrated means to set the gage at the prescribed position, a lens carrier mounted at the upper portion of the housing for movement by hand to locate the upper margin of the segment in coincidence with the gage, a transparent medium set in the lens carrier and through which the gage may be viewed, said medium having a line paralleling the gage and to which the optical axis may be set to insure proper placement of the lens upon the lens carrier, and a sighting lens being movable forward and backward with the carriage and directed toward the gage to facilitate accurate placement of the upper margin of the segment in coincidence with said gage.

10. In a machine of the class described, means for locating the segment in prescribed relation to the horizontal axis of a lens having its optical axis impressed thereon comprising a housing with a sight-opening in the upper portion thereof, a carriage mounted for forward and backward movement in a straight line in said housing, a gage fixed to the carriage and extending transversely beneath the sight-opening and to which the upper margin of the segment may be set, means for moving the carriage including calibrated means to set the gage at the prescribed position, a lens carrier mounted at the upper portion of the housing for movement by hand to locate the upper margin of the segment in coincidence with the gage, a transparent medium set in the lens carrier and through which the gage may be viewed, said medium having a line paralleling the gage and to which the optical axis may be set to insure proper placement of the lens upon the lens carrier, a target in the housing below the sight-opening, and means in the housing for illuminating said target so that the outline of the lens segment may be distinctly seen.

11. In a machine of the class described, means whereby the segment may be located in prescribed relation to the right or left of the geometrical center of an ophthalmic lens on which the optical center and optical axis have been impressed, comprising a pair of parallel gages to which opposite sides of the segment may be set, movable supporting means for said gages, a rack fixed to said supporting means, a pinion intermeshing with said rack, calibrated means for rotating said pinion to set the gages in position to locate the segment in prescribed relation to the geometrical center, a lens carrier movable by hand to the right and left to locate the lens segment in proper position with respect to the gages, intersecting means on the lens carrier to cooperate with the optical center of the lens in enabling proper placement of the latter upon the carrier, and relatively stationary supporting means for the lens carrier and the movable supporting means.

12. In a machine of the class described, means whereby the segment may be located in prescribed relation to the right or left of the geometrical center of an ophthalmic lens on which the optical center and optical axis have been impressed, comprising a pair of parallel gages to which opposite sides of the segment may be set, movable supporting means for said gages, a rack fixed to said supporting means, a pinion intermeshing with said rack, calibrated means for rotating said pinion to set the gages in position to locate the segment in prescribed relation to the geometrical center, a lens carrier movable by hand to the right and left to locate the lens segment in proper position with respect to the gages, intersecting means on the lens carrier to cooperate with the optical center of the lens in enabling proper placement of the latter upon the carrier, relatively stationary supporting means for the lens carrier and the movable supporting means, and means operably mounted upon the relatively stationary supporting means for marking the geometrical center upon the lens.

13. In a machine of the class described, means whereby the segment may be located in prescribed relation to the right or left of the geometrical center of an ophthalmic lens on which the optical center and optical axis have been impressed, comprising a pair of parallel gages to which opposite sides of the segment may be set, supporting members for said gages, a pair of reversely disposed racks arranged transversely to the gages and to which said supporting members are fixed, a pinion intermeshing with said racks to simultaneously move the same in opposite directions and thereby space the gages to coincide with the opposite sides of the segment, means for rotating said pinion, a movable guide for the racks, supporting means for said guide, rack and pinion means for moving said guide and the pair of racks bodily to the right or left, calibrated means for actuating said rack and pinion means and to indicate when the gages are in position to locate the segment in prescribed relation to the geometrical center, a lens carrier movable to the right and left on the supporting means to locate the opposite sides of the lens segment in coincidence with the gages, and means on said lens carrier to cooperate with the optical center of the lens in enabling proper placement of the latter upon the carrier.

14. In a machine of the class described, means whereby the segment may be located in prescribed relation to the right or left of the geometrical center of an ophthalmic lens on which the optical center and optical axis have been impressed, comprising a pair of parallel gages to which opposite sides of the segment may be set, movable supporting means for said gages, mechanism for moving said supporting means to the right or left including calibrated means for indicating when the gages are in position to locate the segment in prescribed relation to the geometrical center of the lens, stationary supporting means for said movable supporting means, a lens carrier movable to the right and left upon the stationary supporting means to locate the lens segment in proper position with respect to the gages, and means on said lens carrier to cooperate with the optical center of the lens in enabling proper placement of the latter upon the carrier.

15. In a machine of the class described, means whereby the segment may be located in prescribed relation to the geometrical center and the horizontal axis of an ophthalmic lens on which the optical center and the optical axis have been impressed, comprising a pair of parallel gages to which the opposite sides of the segment may be set, movable supporting means for said gages, mechanism including calibrated means for moving said supporting means and the gages in position to locate the segment in prescribed relation to the right or left of the geometrical center of the lens, a carriage upon which the movable supporting means is mounted, a gage on said carriage extending transversely to the pair of gages and to which the upper margin of the segment may be set, calibrated means for moving said carriage and the transverse gage forward or backward to enable the segment to be located vertically in prescribed relation to the geometrical center of the lens, a lens carrier movable to the right and left and forward and backward to locate the upper and side margins of the segment in coincidence with the respective gages, means on said lens carrier for cooperating with the optical center and optical axis of the lens in enabling proper placement of the latter upon the carrier, and supporting means for the carriage and the lens carrier.

16. In a machine of the class described, means whereby the segment may be located in prescribed relation to the geometrical center and the horizontal axis of an ophthalmic lens on which the optical center and the optical axis have been impressed, comprising a pair of parallel gages to which the opposite sides of the segment may be set, movable supporting means for said gages, mechanism including calibrated means for moving said supporting means and the gages in position to locate the segment in prescribed relation to the right or left of the geometrical center of the lens, a carriage upon which the movable supporting means is mounted, a gage on said carriage extending transversely to the pair of gages and to which the upper margin of the segment may be set, a sighting-lens mounted upon the parallel gage supporting means and focused on the transverse gage to determine when the upper margin of the segment is in coincidence with the latter gage, calibrated means for moving said carriage and the transverse gage forward or backward to enable the segment to be located vertically in prescribed relation to the geometrical center of the lens, a lens carrier movable to the right and left and forward and backward to locate the upper and side margins of the segment in coincidence with the respective gages, means on said lens carrier for cooperating with the optical center and optical axis of the lens in enabling proper placement of the latter upon the carrier, and supporting means for the carriage and the lens carrier.

OTHELLO M. SMITH.